United States Patent [19]

Tasaki et al.

[11] Patent Number: 5,215,721
[45] Date of Patent: Jun. 1, 1993

[54] GAS GENERATING DEVICE

[75] Inventors: Youji Tasaki; Nobuyoshi Sasaki, both of Aichi, Japan

[73] Assignee: Nippon Oil and Fats Co., Ltd., Japan

[21] Appl. No.: 755,827

[22] Filed: Sep. 6, 1991

[30] Foreign Application Priority Data

Sep. 6, 1990 [JP] Japan .................................. 2-238211
Nov. 30, 1990 [JP] Japan .................................. 2-338497

[51] Int. Cl.⁵ .............................................. B60R 21/00
[52] U.S. Cl. .................................. 422/165; 422/166; 280/740; 55/487; 55/523; 102/530
[58] Field of Search ............. 55/487, 523, 525, 385.3, 55/DIG. 43, DIG. 47; 422/165, 166; 280/740, 741–742, 736; 102/530–531

[56] References Cited

U.S. PATENT DOCUMENTS

| 3,780,872 | 12/1973 | Pall ........................................ 55/525 |
| 3,972,545 | 8/1976 | Kirchoff et al. ........................... 21/8 |
| 4,012,211 | 3/1977 | Goetz ..................................... 55/385.3 |
| 4,017,100 | 4/1977 | Gehrig et al. .......................... 55/385.3 |
| 4,547,342 | 10/1985 | Adams et al. ........................ 422/166 |
| 4,799,956 | 1/1989 | Vogel ....................................... 75/243 |
| 4,865,635 | 9/1989 | Cuevas .................................... 55/487 |
| 4,902,036 | 2/1990 | Zander et al. ......................... 280/736 |
| 4,943,086 | 7/1990 | Cunningham ......................... 280/741 |
| 5,064,459 | 11/1991 | Unterforsthuber et al. ........... 55/512 |
| 5,087,070 | 2/1992 | O'Loughlin et al. ................ 280/740 |
| 5,100,171 | 3/1992 | Faigle et al. .......................... 280/736 |

FOREIGN PATENT DOCUMENTS

| 0359407 | 8/1989 | European Pat. Off. ................ 21/26 |
| 2629462 | 6/1976 | Fed. Rep. of Germany .......... 46/24 |
| 2625961 | 1/1989 | France ................................... 21/26 |
| 53-13411 | 5/1978 | Japan . |
| 55-110642 | 8/1980 | Japan . |
| 2-19020 | 4/1990 | Japan . |
| 2-155861 | 6/1990 | Japan . |

OTHER PUBLICATIONS

Jan. 1992, European Search report.

Primary Examiner—Robert J. Warden
Assistant Examiner—Krisanne M. Thornton
Attorney, Agent, or Firm—Stetina and Brunda

[57] ABSTRACT

A gas generating device for supplying gas in an air bag or the like is provided with a gas generating composition, which is burned by an ignitor to generate gas, and a primary filter for filtering the burnt gas. The gas generating composition and the filter are placed in a combustion chamber having a primary gas exhausting port. The primary filter is chemically inactive with respect to the burnt procedure of the gas generating composition. The filter has a metal screen whose melting point is equal to or higher than the burning temperature of the gas generating composition. A cooling chamber is provided which communicates via the primary gas exhausting port with the combustion chamber. In the cooling chamber is disposed a secondary filter which cools gas coming out of the combustion chamber and filters the burning residue in the gas. A secondary gas exhausting port is formed in the cooling chamber to discharge the gas filtered by the secondary filter. The secondary filter includes a ceramic fiber sheet with a bulk density of 0.10 to 0.30 g/cm³ and a filtering period of 1.0 to 6.0 sec/300 cc per 1 mm in thickness (time needed to pass 300 cc of gas through the filter).

14 Claims, 3 Drawing Sheets

GAS GENERATING DEVICE

This application claims the priority of Japanese Patent Application Nos. 2-238211 and 2-338497 filed on Sep. 6, 1990 and Nov. 30, 1990 [which are incorporated herein by reference].

BACKGROUND OF THE INVENTION

1. Field of the Invention

The present invention relates to a gas generating device for inflating an air bag to protect a driver in a vehicle, and more particularly, to a gas generating device equipped with filters.

2. Description of the Related Art

A conventional gas generating device of this type is disclosed, for example, in Japanese Patent Publication No. 2-19020. This gas generating device 30 retains a pelletized gas generating composition 36 in its combustion chamber 31, as shown in FIG. 8. In the combustion chamber 31 are placed an igniting device for igniting the gas generating composition 36, and a primary filter 32 for collecting the residue of a burnt gas generating composition. Provided around the combustion chamber 31 is a cooling chamber 37 where a secondary filter 39 is located to cool gas and to condense solid state particles (burning residue). When the igniting device is activated, the gas generating composition 36 burns to generate gas, which passes through the primary filter 32 and enters a diffusion space. The gas is then purified by the secondary filter 39 so as to be supplied through a gas exhaust port into an air bag.

The primary filter 32 consists of three elements: a layered metal wide mesh screen 33 in the vicinity of the inner wall of the combustion chamber 31, a glass fiber cloth 34 located inward of the screen 33, and a layered metal fine mesh screen 35 located inward of the cloth 34.

The conventional gas generating device uses a glass fiber cloth for the primary filter 32. While the glass fiber cloth effectively collects burning residue, it may be melted by the heat of the gas generating composition. When melted, the glass fiber cloth becomes sticky. The glass fiber and the residue will therefore be integrated so as to cause clogging in the glass fiber cloth 34, or the melted glass fiber will be adhered to the screen 33 to cause clogging. Under these circumstances, the inner pressure of the combustion chamber 31 substantially rises, and the walls of the combustion chamber 31 and the cooling chamber 37 are deformed, so that the gas is discharged without passing through the secondary filter 39, i.e., a short path phenomenon occurs.

The secondary filter 39 of the conventional gas generating device, like the primary filter 32 consists of three elements. These elements are a multi-layered wide metal wire mesh, a multi-layered aluminum silicate cover that surrounds the wire mesh, and a fine screen. These are arranged outward in the named order.

The individual elements of the secondary filter 39 tend to have inappropriately high bulk densities. Thus, the gases do not pass therethrough a quickly as desired. Thus the internal pressure in the gas generating device may rise abnormally rise or clogging may occur in the filter.

Japanese Unexamined Patent Publication No. 2-155861 discloses the use of a heat-resistant porous material, an inorganic fibrous sheet, a porous ceramic filter, a dutch woven wire mesh and a fine wire mesh in combination, as a secondary filter. The dutch woven wire mesh is woven like the surface of tatami (Japanese mat) with vertical lines Lv and transverse lines Lt which extend close to one another in a transverse direction, as shown in FIG. 9. Since the bulk densities of the elements of such a secondary filter as those of the above-described secondary filter, are improperly set, it is not possible to solve the problem about the normal rise of the internal pressure of the gas generating device and the clogging of the filters.

SUMMARY OF THE INVENTION

It is therefore an object of the present invention to provide a gas generating device which can prevent filters from being clogged by solid products in the burnt gas, and can surely collect the solid products without causing an abnormal rise of the internal pressure when a gas generating composition is burned.

It is another object of the present invention to provide a gas generating device which can effectively cool burnt gas, and can easily be manufactured at a low cost.

To achieve these objects, the gas generating device of the present invention includes a gas generating composition, which is burned by an igniting means to generate gas, and a primary filter for filtering burnt gas. The gas generating composition and the filter are placed in a combustion chamber having a primary gas exhausting port. The primary filter is chemically inactive with respect to the burnt products of the gas generating composition. The filter comprises a metal screen whose melting point is equal to or higher than the burning temperature of the gas generating composition.

According to one preferred embodiment of the present invention, a cooling chamber is provided which communicates via the primary gas exhausting port with the combustion chamber. In the cooling chamber a secondary filter is disposed which cools gas coming out of the combustion chamber and filters the burning residue in the gas.

Further, a secondary gas exhausting port is formed in the cooling chamber to discharge the gas filtered by the secondary filter. The secondary filter includes a ceramic fibrous sheet with a bulk density of in the range of about 0.10 to 0.30 g/cm$^3$ and a filtering period in the range of about 1.0 to 6.0 sec/300 cc per 1-mm thickness (time needed to pass 300 cc of gas through the filter).

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments together with the accompanying drawings in which:

DETAILED DESCRIPTION OF THE PREFERRED EMBODIMENT

Figure 1:
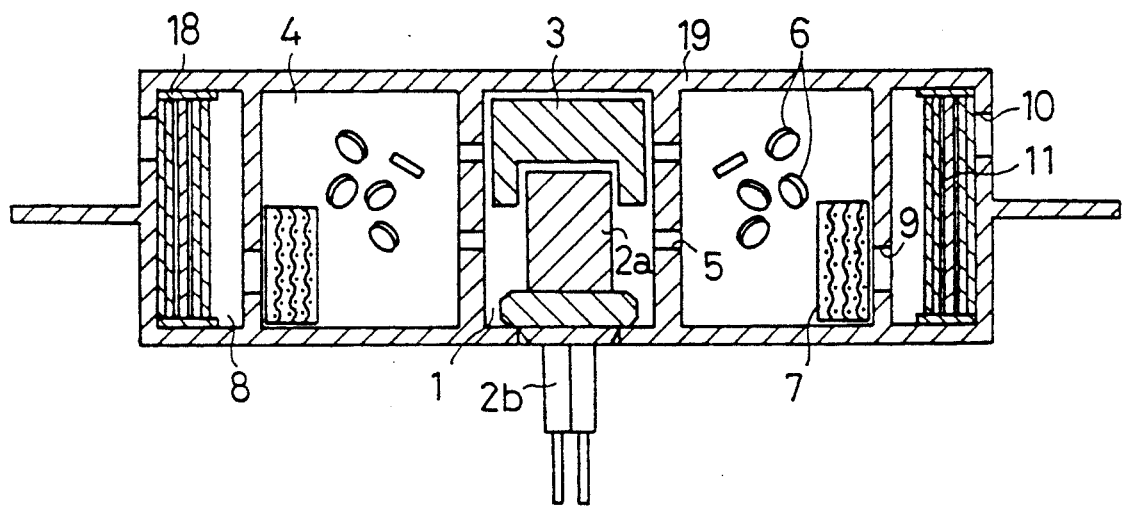
FIG. 1 is a cross section of a gas generating device embodying the present invention.

A gas generating device embodying the present invention will be described below referring to FIGS. 1 through 6. In FIG. 1, an igniter chamber 1 is formed in the center portion of a housing 19 of the gas generating device. On the inner bottom of the igniter chamber 1 is fixed a squib 2a to which a lead 2b is connected. The igniter chamber 1 is filled around the upper portion of the squib 2a with an igniter material 3. The squib 2a and the igniter material 3 constitute an igniting means.

An annular combustion chamber 4 is formed concentrically around the igniter chamber 1. Igniter chamber ports 5 are formed through an intermediate wall between the igniter chamber 1 and the combustion chamber 4 to permit communication between these chambers. Gas generating composition pellets 6 are retained in this combustion chamber 4, and a combustion filter (primary filter) 7 is disposed therein.

An annular cooling chamber 8 is provided around the combustion chamber 4 such that it is concentric with the igniter chamber 1. A combustion chamber port (primary gas exhaust port) 9 is formed through an intermediate wall between the combustion chamber 4 and the cooling chamber 8 to permit communication therebetween. The primary filter 7 is disposed in the combustion chamber 4 so as to cover the port 9 and so that the port 9 faces nearly the middle height of the primary filter 7.

A gas exhaust port (secondary gas exhaust port) 10 is formed in the outer wall of the cooling chamber 8, so that the chamber 8 communicates with the outside of the gas generating device. A secondary filter 11 is disposed in the cooling chamber 8 so as to cover the gas exhaust port 10.

When a vehicle installed with the gas generating device embodying the present invention collides with something, such as another vehicle, a collision detector also installed in the vehicle activates the squib 2a to ignite the igniter material 3. The flame and heat caused by the ignition of the igniter material 3 propagates through the ports 5 into the combustion chamber 4, reaching the pellets 6, and the pellets 6 start burning. The combustion raises the internal pressure of the combustion chamber 4. When the hot gas and burning residue, originated in the combustion chamber 4, pass through the primary filter 7, they are properly cooled down and the residue is filtered. Then, this gas flows through the port 9 into the cooling chamber 8. When passing through the secondary filter 11, the burnt gas is further cooled down and unfiltered burning residue is collected. The burning residue is therefore collected efficiently and effectively. The cooled gas flows through the gas exhaust port 10 into the air bag to surely inflate and expand the air bag.

The primary filter 7 comprises a metal mesh screen which should be made of metal that does not chemically react with the burnt products of the pellets 6 and has a melting point equal to the burning temperature of the pellets 6 (500° to 1400° C.) or greater. For instance, the material may be metal, such as stainless steel, iron, nickel or aluminum, or an alloy of the mentioned metals. Stainless steel is the most preferable material. It is not suitable to use certain non-metallic materials, such as glass fibers, which start melting at the burning temperature of the pellets 6 to become adhesive. Similarly, certain metals, such as lead, which have a melting point lower than the burning temperature of the pellets 6 should not be used.

Each gas generator pellet 6 typically comprises sodium azide and an oxidant. Another improper material for the primary filter 7 is a compound, such as aluminum silicate, which chemically reacts with the burning residue of the pellets, i.e., sodium oxide.

Figure 2:
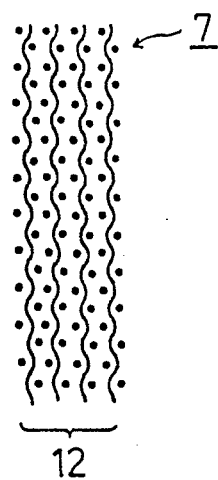
FIG. 2 is a partially enlarged cross sectional view of a combustion chamber filter (a primary filter) for use in the gas generating device shown in FIG. 1.
Figure 4:
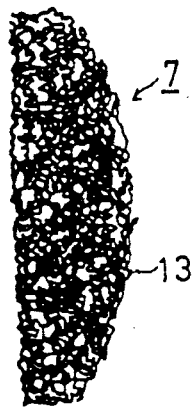
FIGS. 4 to 6 are partially enlarged cross sectional views of various alternative primary filters embodiments.

As the primary filter 7, a metal mesh screen with a mesh size in the range of 8 to 100 (wires per inch) is used. When the primary filter 7 is constituted of one type of mesh as shown in FIG. 2, it is preferable to use a metal mesh screen 12 having a mesh size in the range of 18 to 30. A compressed wire filter 13 made of knit wires equivalent to 18 to 50 wires per inch as shown in FIG. 4 may also be used as long as it has the same cooling and filtering effects as the screen 12. This compressed wire filter 13 is preferable because of its high mass-productivity and good filtering effect.

Figure 5:
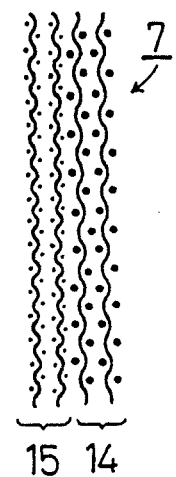

The primary filter 7 may consist of two types of metal mesh screens to have a two-layered structure. More specifically, as shown in FIG. 5, a wide mesh screen is disposed on the pellet 6 side (on the right side in the diagram) and a fine mesh screen is located on the side of the peripheral wall of the combustion chamber 4 (on the left side in the diagram). For instance, it is preferable that a metal mesh screen 14 having a mesh size in the range of 8 to 10 be positioned on the pellet 6 side, while a metal mesh screen 15 with a mesh size of 18 to 30 is positioned on the peripheral wall side of the combustion chamber 4.

Figure 6:
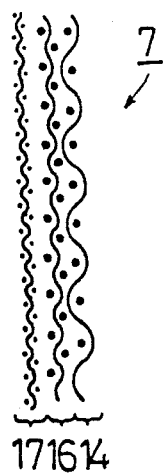

The primary filter 7 may consist of three types of metal mesh screens. More specifically, the individual screens are disposed in such a way that the widest mesh screen is positioned on the pellet side, a finer mesh screen comes next, and the finest mesh screen is located on the peripheral wall side, as shown in FIG. 6. For instance, a metal mesh screen 14 with 8 to 10 wires per inch, a medium-wide metal mesh screen 16 with 12 to 18 wires per inch and a metal mesh screen 17 with 24 to 100 wires per inch, are positioned toward the peripheral wall side from the pellet side in the named order.

When the mesh size of each metal mesh screen is less than 8 wires per inch, the filtering is insufficient, whereas when the mesh size exceeds 100 wires per inch, the screen will easily cause clogging, both cases being undesirable.

According to the present invention, the primary filter 7 may be constituted of a combination of a compressed wire filter of knit wires and a metal mesh screen, or four or more layers of metal mesh screens.

The weight of the primary filter 7, though depending on materials, is in the range of 20 to 80% by weight of the total weight of the pellets 6, and preferably within 40 to 60% by weight. If the weight of the filter 7 is less than 20% by weight, the amount of filtering is too small to provide enough cooling and filtering effects. If the weight of the filter 7 exceeds 80% by weight, sufficient cooling and filtering effects are generally obtained, whereas gas is cooled more than needed, and the total amount of gas exhausted from the gas generating device is reduced, so that an air bag does not expand sufficiently.

Since the flow rate of gas is lower in the combustion chamber 4 than in the cooling chamber 8, the primary filter 7 cools the gas more effectively than the secondary filter 11 does.

As described above, to provide steady cooling and filtering effects, the amount of the secondary filter 11 in use has to be reduced when the amount of the primary filter 7 in use is increased. By way of example, suppose that 90 g of the pellets 6 are used and a 30 g primary filter 7 is used (about 33% of the weight of the pellets 6). The weight of the secondary filter 11 would then be approximately 110 g. If a 60 g primary filter 7 is used (about 67% of the weight of the pellets 6), the weight of the secondary filter 11 would be about 80 g.

Figure 3:
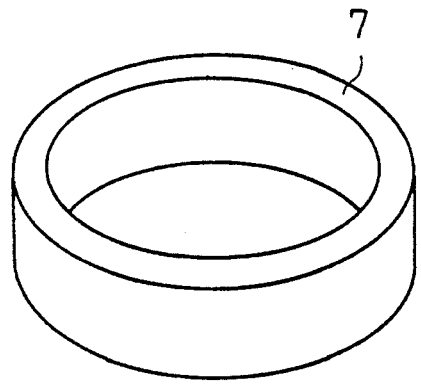
FIG. 3 is a perspective view illustrating the primary filter shown in FIG. 1.

A rectangle, trapezoid or fan may be adopted as the cross section of the primary filter 7 as needed. With a rectangular cross section, the general shape of the primary filter 7 is as shown in FIG. 3. The height (width) of the primary filter 7 from the bottom of the combustion chamber 4 may be set equal to that of the combustion chamber 4. It is more preferable that the height of the filter 7 be 1.5 to 4 times the diameter of the port 9. If the height of the filter 7 is less than 1.5 times the diameter of the port 9, gas might pass from the combustion chamber 4 to the cooling chamber 8 without being cooled and filtered sufficiently. If the height of the filter 7 exceeds four times that diameter, the weight of the filter will increase, so will the manufacturing cost of the gas generating device.

Figure 7:
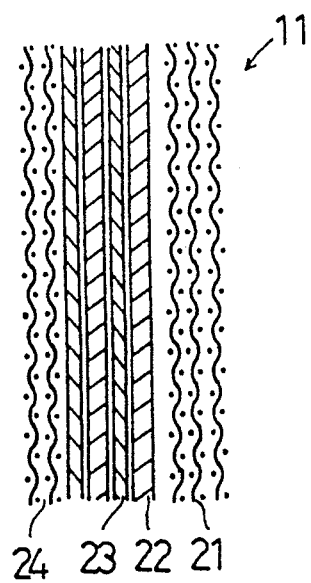
FIG. 7 is a partially enlarged cross sectional view of a cooling filter (a secondary filter) of the gas generating device shown in FIG. 1.
Figure 8:
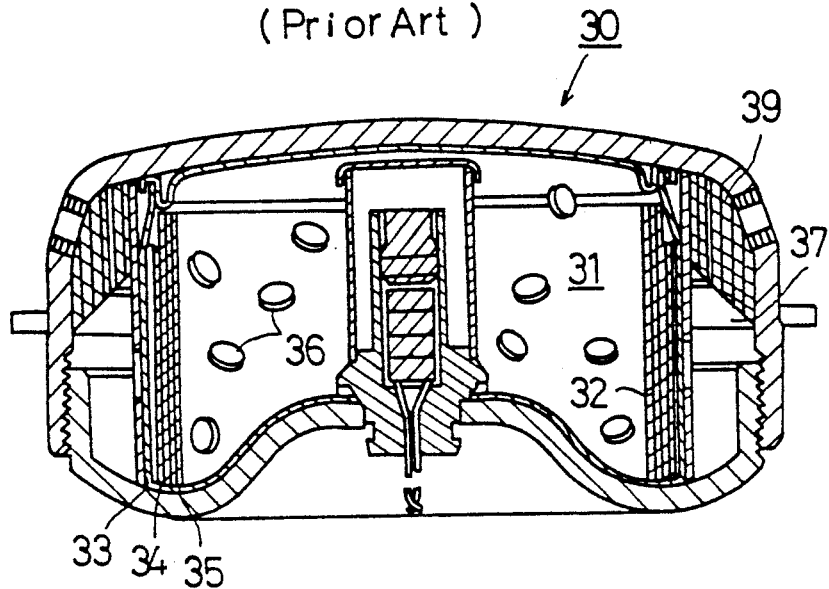
FIG. 8 is a cross section of a conventional gas generating device.

The secondary filter 11 consists of a plain woven wire mesh 21, a laminate of a ceramic fiber sheet 22, a dutch woven wire mesh 23, and a plain woven wire mesh 24, as shown in FIG. 7. These elements are disposed in layers from the combustion chamber side to the cooling chamber side and along the inner wall of the cooling chamber 8.

The plain woven wire mesh 21 closest to the combustion chamber 4 serves to cool and filter the burnt products of the pellets 6. Its mesh size is in the range of 18 to 100 wires per inch, preferably in the range of 24 to 50. When the mesh size of the plain woven wire mesh 21 is less than 18 wires per inch, the filtering performance is insufficient, whereas when this mesh size exceeds 100 wires per inch, the mesh 21 will be clogged, both cases being undesirable.

When in use, the plain woven wire mesh 21 is turned one layer or more. With the plain woven wire mesh 21 having less than one turn, the filtering performance is insufficient; the upper limit of the weight of the mesh is set below the weight of the pellets to be used. If the amount or weight of the plain woven wire mesh 21 in use exceeds the weight of the pellets, gas is excessively cooled while the burning residue is collected, undesirably. The material for the plain woven wire mesh 21 is selected from metals, such as stainless steel, iron, nickel and aluminum, or an alloy of the mentioned metals. Stainless steel and iron are the most preferable materials.

The laminate of the ceramic fiber sheet 22 and the dutch woven wire mesh 23 is disposed inward of the plain woven wire mesh 21. The ceramic fiber sheet 22 essentially consists of silicone dioxide ($SiO_2$) and alumina ($Al_2O_3$), and is formed into a sheet by an organic or inorganic binder. To increase the filtering period or tensile strength, the ceramic fiber sheet 22 may contain a metal fiber or glass fiber with a diameter of several $\mu m$. The finer the mesh of the ceramic fiber sheet 22 is, the higher the filter performance becomes, but the gas-passing resistance increases, raising the internal pressure of the gas generating device. The use of the ceramic fiber sheet 22 therefore requires that the bulk density be maintained appropriately while reducing the mesh size to some extent, thereby ensuring good air permeability. In this respect, the ceramic fiber sheet 22 used in this embodiment has a bulk density of 0.10 to 0.30 $g/cm^3$ and a filtering period per 1-mm thickness of 1.0 to 6.0 sec/300 cc.

The ceramic fiber sheet 22 serves to collect the minute burning residue, metallic sodium (Na), sodium oxide ($Na_2O$) and the like contained in the burnt gas.

When the bulk density of the ceramic fiber sheet 22 is less than 0.10 $g/cm^3$ or the filtering period per 1-mm thickness is less than 1.0 sec/300 cc, the sheet 22 undesirably has a low performance of collecting the burning residue or the like. When the bulk density exceeds 0.30 $g/cm^3$ or the filtering period per 1-mm thickness exceeds 6.0 sec/300 cc, the filtering period is slow though the filtering performance is high. This will result in an undesirable rise of the internal pressures of the cooling chamber 8 and the combustion chamber 4.

Figure 9:
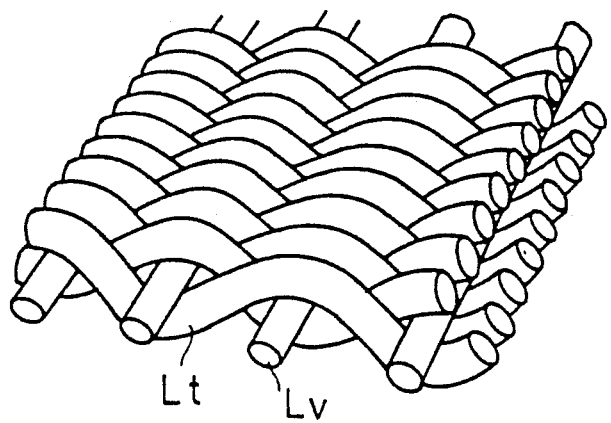
FIG. 9 is a partial perspective view illustrating the structure of a dutch woven wire mesh.

The dutch woven wire mesh 23 is laminated outside the ceramic fiber sheet 22 in order to reinforce the sheet 22 and prevent the sheet 22 from being damaged. The dutch woven wire mesh 23, having vertical lines Lv and transverse lines Lt, is woven in such a manner that the transverse lines Lt may extend close to one another in the transverse direction, as shown in FIG. 9. The dutch woven wire mesh 23 may be made of the same material as the plain woven wire mesh 21.

The dutch woven wire mesh 23 in use has 20/100 to 150/1000 wires per inch, where the numerator represents the number of the vertical lines Lv present within the interval of one inch (25.4 mm) and the denominators the number of the transverse lines Lt. The filtered particle size of the wire mesh with 20/100 wires per inch is about 200 $\mu m$, and the filtered particle size of the wire mesh with 150/1000 wires per inch is about 30 $\mu m$.

When the mesh size is less than 20/100 wires per inch, the mesh is wide to provide a good air permeability, but the ceramic fiber is easily damaged so that its broken pieces may easily come out through the meshes, unsuitably. When the mesh size exceeds 150/1000 wires per inch, on the other hand, the mesh is fine and clogging may easily occur, resulting in an undesirable rise of the internal pressure of the gas generating device.

The laminate of the ceramic fiber sheet 22 and the dutch woven wire mesh 23, when in use, is turned one to three layers as needed. FIG. 7 exemplifies a two-layered laminate. With the amount of the laminate in use being less than one layer, the filtering effect is insufficient. When the amount of the laminate exceeds three layers, providing a sufficient filtering effect, large amounts of the fine ceramic fiber sheet 22 and dutch woven wire mesh 23 are used so that the pressure loss to the flow rate increases, thus raising the internal pressures of the cooling chamber 8 and the combustion chamber 4.

The outermost plain woven wire mesh 24 in the secondary filter 11 has a mesh size of 8 to 50. This plain woven wire mesh 24 serves to reinforce the dutch woven wire mesh 23 of the laminate located inward of the mesh 24, so that it can endure the gas pressure applied to the dutch woven wire mesh 23 and prevent the mesh 23 from being broken.

When the plain woven wire mesh 24 has a mesh size of less than 8, the mesh is too wide to endure the gas pressure applied to the dutch woven wire mesh 23 located inward of the mesh 24. When the plain woven wire mesh 24 has a mesh size of more than 50, the wire diameter becomes too small to have a sufficient strength, which is not desirable. The material for the plain woven wire mesh 24 is the same as that for the plain woven wire mesh 21. Further, the plain woven wire mesh 24, when in use, is turned one to three layers as needed. Without the plain woven wire mesh 24, there would be fewer passages for gas and the pressures in the combustion chamber 4 and the cooling chamber 8 undesirably rise. With the mesh 24 turned more than three layers, although the sufficient passage for gas can be secured, the weight of the mesh will undesirably be increased.

As described above, three specific types of filter members are wound a predetermined number of times and are laminated one on another to serve as the secondary filter 11, so that the burnt gas generated by the gas generating composition pellets can efficiently be cooled and the burnt products can surely be collected without causing clogging in the filter.

At the top and bottom of the secondary filter 11 are disposed gaskets 18 of silicone rubber or graphite which is heat-resistant and flame-retardant in order to prevent leakage of any burnt gas. The gaskets 18 are 0.5 to 2 mm thick. With the gaskets 18 being less than 0.5 mm thick, the wire meshes do not sufficiently cut into the gaskets so that the wire meshes will not be held at their proper positions, causing a gas leakage. With the thickness of the gaskets 18 exceeding 2 mm, the wire meshes will cut deep into the gaskets unnecessarily and the reactive force will undesirably deform the wire meshes. When the gaskets 18 are made of graphite, the bulk density is 0.6 to 1.4 g/cm$^3$. When the bulk density is less than 0.6 g/cm$^3$, the gas sealing performance is insufficient, while with the density exceeding 1.4 g/cm$^3$, the gaskets become too hard, so that the wire meshes will not easily cut into the gaskets.

The present invention will now be specifically described referring to Examples and Comparative examples.

EXAMPLE 1

The housing 19 of the gas generating device 20 with the individual sections of the following sizes was formed of 1-mm thick stainless steel.

| | |
|---|---|
| Outer diameter of cooling chamber 8 | 101 mm |
| Outer diameter of combustion chamber 4 | 75 mm |
| Outer diameter of igniter chamber 1 | 25 mm |
| Height of housing | 40 mm |

Twelve holes of 8 mm in diameter were formed at the equal angles as the ports 9.

Twenty-four holes of 8 mm in diameter were formed as the ports 10 at the same angles in the cooling chamber 8. Boron niter (2 g) and an electronic igniting squib 2a were retained as the igniter material 3 in the igniter chamber 1.

The secondary filter 11 accommodated in the cooling chamber 8 comprises the following elements.

(1) A stainless steel plain woven wire mesh 21. This is the inner layer of the filter 11. The physical dimensions of the wire mesh 21 were:

| | |
|---|---|
| Height | 37 mm |
| Wire diameter | 0.30 mm |
| Mesh size | 24 wires per inch |
| Number of turns | 3 layers |

(2) A laminate of the ceramic fiber sheet 22 and the stainless steel dutch woven wire mesh 23, each being one turn, was turned two times with the ceramic fiber sheet 22 located on the inner side. This laminate constitutes the intermediate layer of the filter 11.

The physical dimensions of the ceramic fiber sheet 22 were:

| | |
|---|---|
| Height | 37 mm |
| Average wire diameter | 1.8 to 3.0 μm |
| Bulk density | 0.14 g/cm$^3$ |
| Filtering period (per 1 mm in thickness) | 1.69 sec/300 cc |
| Thickness | 1.6 mm |

Stainless dutch woven wire mesh 23 had the following dimensions:

| | |
|---|---|
| Height | 37 mm |
| Vertical wire diameter/ transverse wire diameter | 0.18/0.14 mm |
| Number of vertical wires/ number of transverse wires | 40/200 wires per inch |

(3) Stainless steel plain woven wire mesh 24. This constitutes the outer layer of the filter 11:

| | |
|---|---|
| Height | 37 mm |
| Wire diameter | 0.35 mm |
| Mesh size | 18 wires per inch |
| Number of turns | 2 layers |

Additionally, 1-mm thick graphite gaskets 18 were provided on the top and bottom of the secondary filter 11.

The pellets 6 contained in the combustion chamber 4 is pelletized and consists of the following elements.

| | |
|---|---|
| Sodium azide (NaN$_2$) | 58% by weight |
| Manganese dioxide (MnO$_2$) | 34% by weight |
| Bentonite (silicate mineral) | 8% by weight |
| Dimension   diameter | 6 mm |
| thickness | 5 mm |
| weight | 99.5 g |

The primary filter 7 comprises a stainless steel plain woven wire mesh whose dimension is as follows.

| | |
|---|---|
| Height | 20 mm |
| Wire diameter | 0.30 mm |
| Mesh size | 18 wires per inch |
| Number of turns | 8 layers |
| Weight | 60 g (about 60% of the weight of the pellets 6) |

A tank tester with a capacity of 60 liters was attached to the gas generating device. The pressure in the combustion chamber 4, the internal pressure of the tank tester and the amount of metallic sodium as a burnt product discharged into the tank were measured. The maximum pressure in the combustion chamber 4 was 81 kgf/cm$^2$, the maximum pressure in the tank 2.2 kgf/cm$^2$, and the exhausted amount of sodium 14 mg. These values were very favorable for the gas generating device for an air bag. The allowable pressure in the tank is generally 1.6 to 3.0 kgf/cm².

EXAMPLE 2

Test was carried out in the same manner as in Example 1 using the same gas generating device except for the following structure.

Primary filter 7:

First stainless steel plain woven screen provided at the outermost position.

| Height | 20 mm |
|---|---|
| Wire diameter | 0.30 mm |
| Mesh size | 24 wires per inch |
| Number of turns | 5 layers |

Second stainless steel plain woven screen provided inward of the first screen.

| Height | 20 mm |
|---|---|
| Wire diameter | 0.35 mm |
| Mesh size | 12 wires per inch |
| Number of turns | 2 layers |

Third stainless steel plain woven screen provided inward of the second screen.

| Height | 20 mm |
|---|---|
| Wire diameter | 0.8 mm |
| Mesh size | 8 wires per inch |
| Number of turns | 1 layer |
| Total weight of the first through third screens | 50 g (about 50% of the weight of pellets 6) |

The maximum internal pressure of the combustion chamber 4 was 65 kgf/cm², the maximum internal pressure of the tank was 2.1 kgf/cm², and the exhausted amount of sodium was 17 mg. The test results for Example 2 showed very favorable values as per Example 1.

EXAMPLE 3

Test was carried out in the same manner as in Example 1 using the same gas generating device except for the following structure.

As the secondary filter 11:

(1) First stainless steel plain woven wire mesh 21:

| Height | 37 mm |
|---|---|
| Wire diameter | 0.35 mm |
| Mesh size | 18 wires per inch |
| Number of turns | 2 layers |

Second stainless steel plain woven wire mesh 21 placed outward of the first plain woven wire mesh

| Height | 37 mm |
|---|---|
| Wire diameter | 0.20 mm |
| Mesh size | 50 wires per inch |
| Number of turns | 2 layers |

(2) A laminate of the ceramic fiber sheet 22 and the stainless steel dutch woven wire mesh 23, each being one turn, was turned one time with the ceramic fiber sheet 22 located on the inner side.

Ceramic fiber sheet 22:

| Height | 37 mm |
|---|---|
| Average wire diameter | 2.8 μm |
| Bulk density | 0.25 g/cm³ |
| Filtering period per 1 mm in thickness | 4.25 sec/300 cc |
| Thickness | 3.0 mm |
| Number of turns | 1 layer |

Stainless dutch woven wire mesh 23:

| Height | 37 mm |
|---|---|
| Vertical wire diameter/ transverse wire diameter | 0.14/0.11 mm |
| Number of vertical wires/ number of transverse wires | 120/1000 (per inch) |
| Number of turns | 1 layer |

(3) Stainless steel plain woven wire mesh 24:

| Height | 37 mm |
|---|---|
| Wire diameter | 0.80 mm |
| Mesh size | 10 wires per inch |
| Number of turns | 1 layer |

The maximum internal pressure of the combustion chamber 4 was 104 kgf/cm², the maximum internal pressure of the tank was 2.07 kgf/cm², and the exhausted amount of sodium was 24 mg. The test results for Example 3 showed vary favorable values.

EXAMPLE 4

Test was carried out in the same manner as in Example 1 using the same gas generating device except for the following structure.

As the secondary filter 11:

(1) First stainless steel plain woven wire mesh 21:

| Height | 37 mm |
|---|---|
| Wire diameter | 0.35 mm |
| Mesh size | 18 wires per inch |
| Number of turns | 1 layer |

Second stainless steel plain woven wire mesh 21 placed outward of the first plain woven wire mesh.

| Height | 37 mm |
|---|---|
| Wire diameter | 0.1 mm |
| Mesh size | 100 wires per inch |
| Number of turns | 2 layers |

(2) A laminate of the ceramic fiber sheet 22 and the stainless steel dutch woven wire mesh 23, each being one turn, was turned three times with the ceramic fiber sheet 22 located on the inner side.

Ceramic fiber sheet 22:

| Height | 37 mm |
|---|---|
| Average wire diameter | 1.8 to 3.0 μm |
| Bulk density | 0.14 g/cm³ |
| Filtering period (per 1 mm in thickness) | 1.69 sec/300 cc |
| Thickness | 1.0 mm |
| Number of turns | 1 layer |

Stainless dutch woven wire mesh 23:

| | |
|---|---|
| Height | 37 mm |
| Vertical wire diameter/ transverse wire diameter | 0.18/0.14 mm |
| Number of vertical wires/ number of transverse wires | 40/200 (per inch) |
| Number of turns | 1 layer |

The maximum internal pressure of the combustion chamber 4 was 83 kgf/cm², the maximum internal pressure of the tank was 2.30 kgf/cm², and the exhausted amount of sodium was 48 mg. The test results for Example 4 showed vary favorable values.

EXAMPLES 5 TO 12

Tests of Examples 5 to 12 were carried out in the same manner as in Example 1, using the same structure of the secondary filter as in Example 1 and ceramic fiber sheets having bulk densities and filtering periods shown in Table 1. The results are also shown in Table 1.

TABLE 1

| Example or Comparative Example | Density g/cm³ | Filtering period sec/ 300 cc | Maximum pressure in comb. chamber kgf/cm² | Pressure in tank kgf/cm² | Amount of sodium mg |
|---|---|---|---|---|---|
| Exam. 5 | 0.10 | 1.69 | 78 | 2.10 | 70 |
| Exam. 6 | 0.30 | 1.69 | 83 | 2.12 | 40 |
| Exam. 7 | 0.16 | 6.0 | 90 | 2.25 | 50 |
| Exam. 8 | 0.16 | 1.0 | 82 | 2.30 | 60 |
| Exam. 9 | 0.10 | 1.0 | 72 | 2.05 | 65 |
| Exam. 10 | 0.30 | 6.0 | 120 | 2.35 | 20 |
| Exam. 11 | 0.10 | 6.0 | 100 | 2.20 | 25 |
| Exam. 12 | 0.30 | 1.0 | 92 | 2.15 | 33 |
| Comp. 9 | 0.08 | 1.69 | 72 | 2.07 | 120 |
| Comp. 10 | 0.35 | 1.69 | 130 | 2.17 | 31 |
| Comp. 11 | 0.16 | 0.08 | 70 | 2.05 | 102 |
| Comp. 12 | 0.16 | 6.5 | 125 | 2.20 | 29 |

It is apparent from Table 1 that when the bulk density and the filtering period are respectively in the ranges of 0.1 to 0.30 g/cm³ and 1.0 to 6.0 sec/300 cc, the maximum pressure in the combustion chamber is equal to or below 120 kgf/cm², which is within the allowable range. The pressure in the tank also falls within the allowable range. The exhausted amount of sodium is 70 mg or below, which is small enough. The test results show that the secondary filters of Examples 5 to 12 are very suitable to be adapted in a gas generating device.

COMPARATIVE EXAMPLE 1

This test was carried out in the same manner as in Example 1 using the same gas generating device except for the following structure.
Primary filter 7:
Stainless steel plain woven screen provided at the outermost position.

| | |
|---|---|
| Height | 38 mm |
| Wire diameter | 0.35 mm |
| Mesh size | 18 wires per inch |
| Number of turns | 1 layer |

Glass fiber filter provided in middle.

| | |
|---|---|
| Wire diameter | 0.8 μm |
| Weight | 16.8 g |
| Thickness | 3 mm |
| Height | 38 mm |
| Number of turns | 1 layer |

Stainless steel plain woven screen provided inward of the glass fiber filter.

| | |
|---|---|
| Height | 38 mm |
| Wire diameter | 0.2 mm |
| Mesh size | 40 wires per inch |
| Number of turns | 2 layers |

As the result, clogging occurred in the primary filter 7 to cause considerable rise of the internal pressure of the combustion chamber 4 to 160 kgf/cm² at a maximum. Since a small amount of the primary filter 7 was used, the cooling and filtering performances were insufficient, and the internal pressure of the tank rose to 3.3 kgf/cm² at a maximum. Further, the significant rise of the internal pressure of the combustion chamber 4 deformed the combustion chamber 4 and the cooling chamber 8, locally causing a short-pass phenomenon and increasing the exhausted amount of sodium to 330 mg.

COMPARATIVE EXAMPLE 2

The structure of the gas generating device used in Comparative example 2 was different from that in Example 1 in the following.
Primary filter 7:

| Stainless steel plain woven screen | |
|---|---|
| Wire diameter | 1 mm |
| Mesh size | 5 wires per inch |
| Number of turns | 5 layers |
| Weight | 60 g |

Test was conducted in the same manner as in Example 1. The internal pressure of the combustion chamber 4 rose to 90 kgf/cm² at a maximum, a little higher than that in Example 1. Since the cooling and filtering performances in the combustion chamber 4 were insufficient and clogging occurred in the secondary filter 11 in the cooling chamber 8, the internal pressure of the tank considerably increased to 4.5 kgf/cm² at a maximum, and the exhausted amount of sodium to 420 mg.

COMPARATIVE EXAMPLE 3

The structure of the gas generating device used in Comparative Example 3 was different from that in Example 1 in the following.
Primary filter 7:

| Stainless steel plain woven screen | |
|---|---|
| Wire diameter | 0.2 mm |
| Mesh size | 150 wires per inch |
| Number of turns | more than one layer |
| Weight | 60 g |

This test was carried out in the same manner as in Example 1. As the result, the internal pressure of the combustion chamber 4 rose to 180 kgf/cm² at a maximum, and the combustion chamber 4 and the cooling chamber 10 were deformed as in Comparative Example 1, causing a short-pass phenomenon.

COMPARATIVE EXAMPLE 4

This test was carried out in the same manner as in Example 1 using the same gas generating device as in Example 1, except that the primary filter 7 in Example 1 weighed 10 g (approximately 10% of the weight of the pellets 6).

The internal pressure of the combustion chamber 4 rose to 98 kgf/cm² at a maximum, a little higher than that in Example 1. Since the cooling and filtering performances were insufficient in the combustion chamber 4, clogging occurred in the secondary filter 11 in the cooling chamber 8 was blocked. The internal pressure of the tank therefore considerably increased to 4.2 kgf/cm² at a maximum, and the exhausted amount of sodium to 180 mg.

COMPARATIVE EXAMPLE 5

This test was carried out in the same manner as in Example 1 using the same gas generating device as in Example 1, except that the primary filter 7 in Example 1 weighed 80 g (approximately 80% of the weight of the pallets 6).

The internal pressure of the combustion chamber 4 rose to 92 kgf/cm² at a maximum, a little higher than that in Example 1. Since the combustion camber 4 was cooled more than necessary, the internal pressure of the tank therefore dropped to 1.2 kgf/cm².

COMPARATIVE EXAMPLE 6

In Comparative Example 6, the laminate of the ceramic fiber sheet 22 and the stainless steel dutch woven wire mesh 23, as the secondary filter 11 in Example 1, were turned four layers. The other structure was the same as that in Example 1.

After the test was conducted in the same manner as in Example 1, the internal pressure of the cooling chamber 8 rose significantly to a maximum of 138 kgf/cm². The cooling and collecting effects were excellent, however, reducing the amount of sodium to 12 mg. The internal pressure of the tank was 1.90 kgf/cm².

COMPARATIVE EXAMPLE 7

The secondary filter 11 in Example 1 was altered to an 8-mesh stainless steel plain woven metal screen with the wire of 1.0 mm in diameter and having a single turn. The other structure was the same as that in Example 1, and test was carried out in the same manner as Example 1.

As the result, the cooling and filtering performances were insufficient, and the internal pressure in the filter chamber increased to 89 kgf/cm² at a maximum, slightly higher than that in Example 1. The internal pressure of the tank however increased to 4.10 kgf/cm² at a maximum, and the amount of sodium to 120 mg, both being very high values.

COMPARATIVE EXAMPLE 8

This test was carried out in the same manner as in Example 1 using the same gas generating device as in Example 1, except that the ceramic fiber sheet 22 and the stainless dutch wire mesh 23 used in Example 2 were not employed.

The test results showed that the internal pressure of the cooling chamber 8 dropped to 36 kgf/cm² at a maximum while the internal pressure of the tank was 10 kgf/cm², a very high level. Further, a large amount of fine residue was discharged into the tank, and a great amount of sodium, 820 mg, was detected.

COMPARATIVE EXAMPLES 9 TO 12

Tests of Comparative Examples 9 to 12 were carried out in the same manner as in Example 1, using the same structure of the secondary filter as in Example 1 and ceramic fiber sheets having bulk densities and filtering periods shown in Table 1. The results are also shown in Table 1.

As apparent from Table 1, Comparative Example 9 where the bulk density was less than 0.10 g/cm³ is not preferable because of the increased exhaust amount of sodium. With the bulk density being greater than 0.30 g/cm³, the internal pressure of the combustion chamber 4 increases as in Compared Example 10, undesirably. Comparative Example 11 wherein filtering period was below 1.0 sec/300 cc is not proper either, because of the increased amount of sodium. Further, Comparative Example 12 wherein filtering period was over 6.0 sec/300 cc is not preferable either because of the rise in the internal pressure of the combustion chamber 4.

The present examples and embodiments are to be considered as illustrative and not restrictive and the invention is not to be limited to the details given herein, but may be modified within the scope of the appended claims.

What is claimed is:

1. A gas generating device comprising:
   a combustion chamber having a primary gas exhaust port;
   a gas generating composition disposed within said combustion chamber that will burn to generate a burnt gas when ignited;
   igniting means disposed proximate said gas generating composition for igniting the gas generating composition;
   a primary filter disposed within said combustion chamber for filtering burning residue from the burnt gas;
   a cooling chamber communicating with the combustion chamber via the primary gas exhaust port;
   a secondary filter, disposed in the cooling chamber, for cooling gas coming out of the combustion chamber and filtering additional burning residue from the burnt gas; and
   a secondary gas exhaust port, provided in the cooling chamber, for discharging the gas filtered by the secondary filter;
   the primary filter having a metal screen that is chemically inactive with respect to burnt products of the gas generating composition, said metal screen being formed of a wire mesh having a mesh size in the range of 8 to 100 wires per inch, and having a weight in the range of 20% to 80% of the weight of the gas generating composition, and;
   the secondary filter including a ceramic fiber sheet having a bulk density in the range of 0.10 to 0.30 g/cm³ and a fiber diameter in the range of 1.8 to 3.0 μm, and being formed of silicone dioxide and alumina.

2. A gas generating device according to claim 1, wherein the primary filter is a compressed wire filter of a knit-wire.

3. A gas generating device according to claim 1, wherein the primary filter is formed of metal selected from the group consisting of stainless steel, iron, nickel and aluminum.

4. A gas generating device according to claim 1, wherein the primary filter has a multi-layered structure and includes a plurality of wire meshes having different mesh sizes, the wire meshes being arranged such that the wire mesh having the widest mesh size is located on a side facing the gas generating composition and the mesh sizes of the remaining wire meshes become progressively finer toward the primary gas exhaust port.

5. A gas generating device according to claim 1, wherein the primary filter covers the primary gas exhaust port and has a width in the range of 1.5 to 4 times an inner diameter of the primary gas exhaust port.

6. A gas generating device according to claim 1, wherein the secondary filter further comprises an inner layer of a plain woven wire and an outer layer of a dutch woven wire mesh, the plain woven wire mesh having vertical wires and transverse wires kept at given gaps and woven in a manner such that the vertical and transverse wires alternatively cross one another, and the dutch woven wire mesh having vertical wires and transverse wires woven in a manner such that the transverse wires extend close to one another.

7. A gas generating device according to claim 6, wherein the plain woven wire mesh constituting the inner layer has a mesh size in the range of 18 to 100 wires per inch.

8. A gas generating device according to claim 6, wherein the dutch woven wire mesh constituting the outer layer has a mesh size of in the range of 20/100 to 150/1000 wires per inch, wherein the numerator represents a number of the vertical wires of the dutch woven wire mesh and the denominator represents a number of the transverse wires of the dutch woven wire mesh.

9. A gas generating device according to claim 1, wherein the secondary filter is secured in the cooling chamber via gaskets comprised of graphite.

10. A gas generating device according to claim 9, wherein the gaskets are in the range of 0.5 to 2 mm thick.

11. A gas generating device according to claim 9, wherein the graphite gaskets have a density in the range of 0.6 to 1.4 g/cm$^3$.

12. A gas generating device according to claim 1, wherein the gas generating composition comprises sodium azide and an oxidant.

13. A gas generating device according to claim 1, wherein the cooling chamber is disposed around said combustion chamber.

14. A gas generating device comprising:
  a combustion chamber having a primary gas exhaust port;
  a gas generating composition disposed within said combustion chamber that will burn to generate a burnt gas when ignited;
  igniting means disposed proximate said generating composition for igniting the gas generating composition;
  a primary filter disposed within said combustion chamber for filtering burning residue from the burnt gas;
  a cooling chamber communicating with the combustion chamber via the primary gas exhaust port;
  a secondary filter, disposed in the cooling chamber, for cooling gas coming out of the combustion chamber and filtering additional burning residue from the burnt gas, the secondary filter being secured in the cooling chamber via gaskets comprised of graphite; and
  a secondary gas exhaust port, provided in the cooling chamber, for discharging the gas filtered by the secondary filter;
  the primary filter having a metal screen that is chemically inactive with respect to burnt products of the gas generating composition, said metal screen being formed of a wire mesh having a mesh size in the range of 8 to 100 wires per inch, and having a weight in the range of 20% to 80% of the weight of the gas generating composition, and the secondary filter including a ceramic fiber sheet having a bulk density in the range of 0.10 to 0.30 g/cm$^3$ and a fiber diameter in the range of 1.8 to 3.0$\mu$, and being formed of silicone dioxide and alumina.

* * * * *